United States Patent [19]

Innes

[11] 4,424,954
[45] Jan. 10, 1984

[54] FIBER OPTIC CABLE TENSION LOADER

[75] Inventor: John L. Innes, Topeka, Kans.

[73] Assignee: Communications Systems, Inc., Hector, Minn.

[21] Appl. No.: 359,365

[22] Filed: Mar. 18, 1982

[51] Int. Cl.³ .............................................. E21C 29/16
[52] U.S. Cl. .................................. 254/134.3 CL; 57/3
[58] Field of Search ................ 57/3, 6; 254/134.3 CL, 254/134.3 R

[56] References Cited

U.S. PATENT DOCUMENTS

| 2,295,749 | 9/1942 | Neale ................................... 175/376 |
| 2,300,035 | 10/1942 | Neale ................................... 175/376 |
| 2,344,051 | 3/1944 | Neale ................................... 175/376 |
| 2,479,635 | 8/1949 | Neale ................................... 175/376 |
| 2,592,943 | 4/1952 | Neale ................................... 175/376 |
| 3,024,000 | 3/1962 | Pfundt ............................... 254/134.3 |
| 3,057,600 | 10/1962 | Neale, Sr. ........................ 254/134.3 |
| 3,174,725 | 3/1965 | Pfundt ............................... 254/134.3 |
| 3,185,443 | 5/1965 | Eitel .................................. 254/134.3 |
| 3,208,727 | 9/1965 | Greene et al. ............. 254/134.3 CL |
| 3,259,370 | 7/1966 | Neale, Sr. ........................ 254/134.3 |
| 3,285,571 | 11/1966 | Weiler ............................... 254/134.3 |
| 3,482,818 | 12/1969 | Neale, Sr. ........................ 254/134.3 |
| 3,556,483 | 1/1971 | Manton ..................... 254/134.3 CL |
| 3,648,975 | 3/1972 | Neale, Sr. ........................ 254/134.3 |
| 3,648,976 | 3/1972 | Neale, Sr. ........................ 254/134.3 |
| 3,783,495 | 1/1974 | Derrer ................................... 29/426 |
| 3,814,383 | 6/1974 | Jackson ........................... 254/134.3 |
| 4,248,035 | 2/1981 | Skillen et al. ............................. 57/6 |
| 4,311,299 | 1/1982 | Elliot, Jr. ........................ 254/134.3 |
| 4,385,485 | 5/1983 | Yonechi ................................. 57/6 X |

Primary Examiner—Donald Watkins
Attorney, Agent, or Firm—Kinney, Lange, Braddock, Westman and Fairbairn

[57] ABSTRACT

The present invention relates to an improved cable lashing machine for securing a fiber optic cable to a supporting strand. The cable lashing machine, which is movable along the supporting strand, has an elongated housing which has a central through bore extending the length of the housing for reception of the fiber optic cable and the supporting strand. A spinning head mounted on the elongated housing carries a coil of lashing line on a rotatable spool and pays out the line to wrap helically around the fiber optic cable and the supporting strand as the elongated housing is advanced along the supporting strand. A tension loading device places tension on the fiber optic cable as it passes through the central bore and as it is lashed to the supporting strand, with the amount of tension supplied being sufficient to maintain the fiber optic cable coextensive relative to the supporting strand.

10 Claims, 11 Drawing Figures

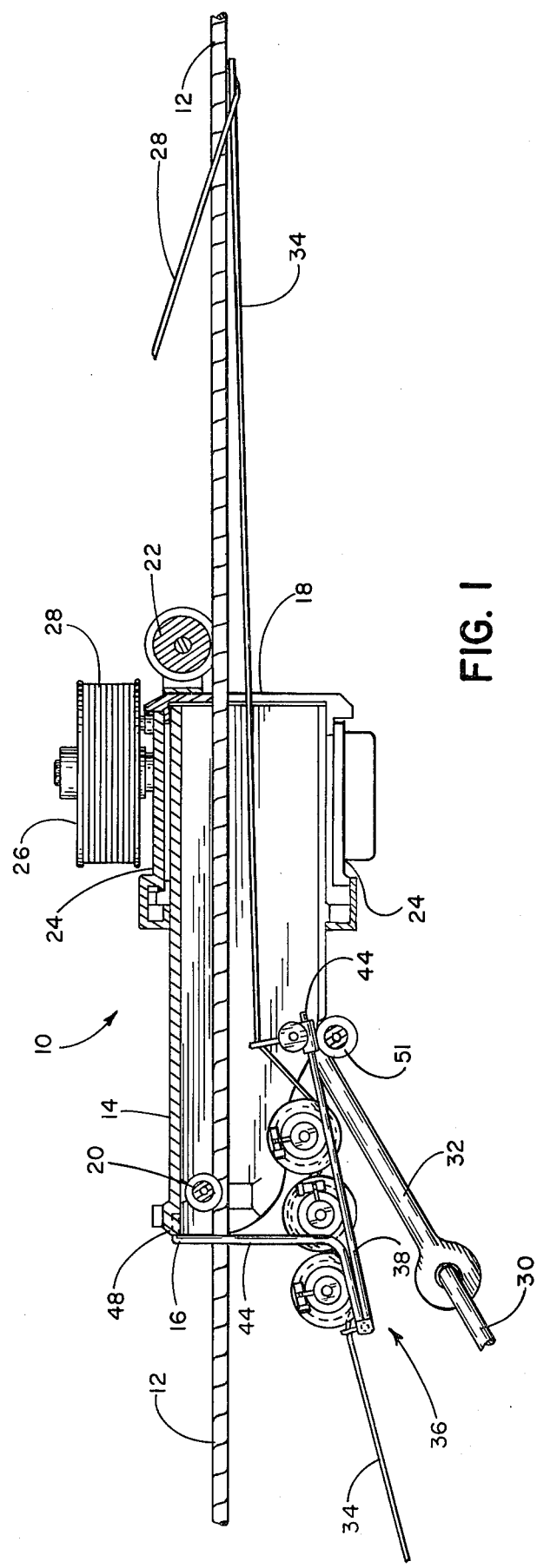

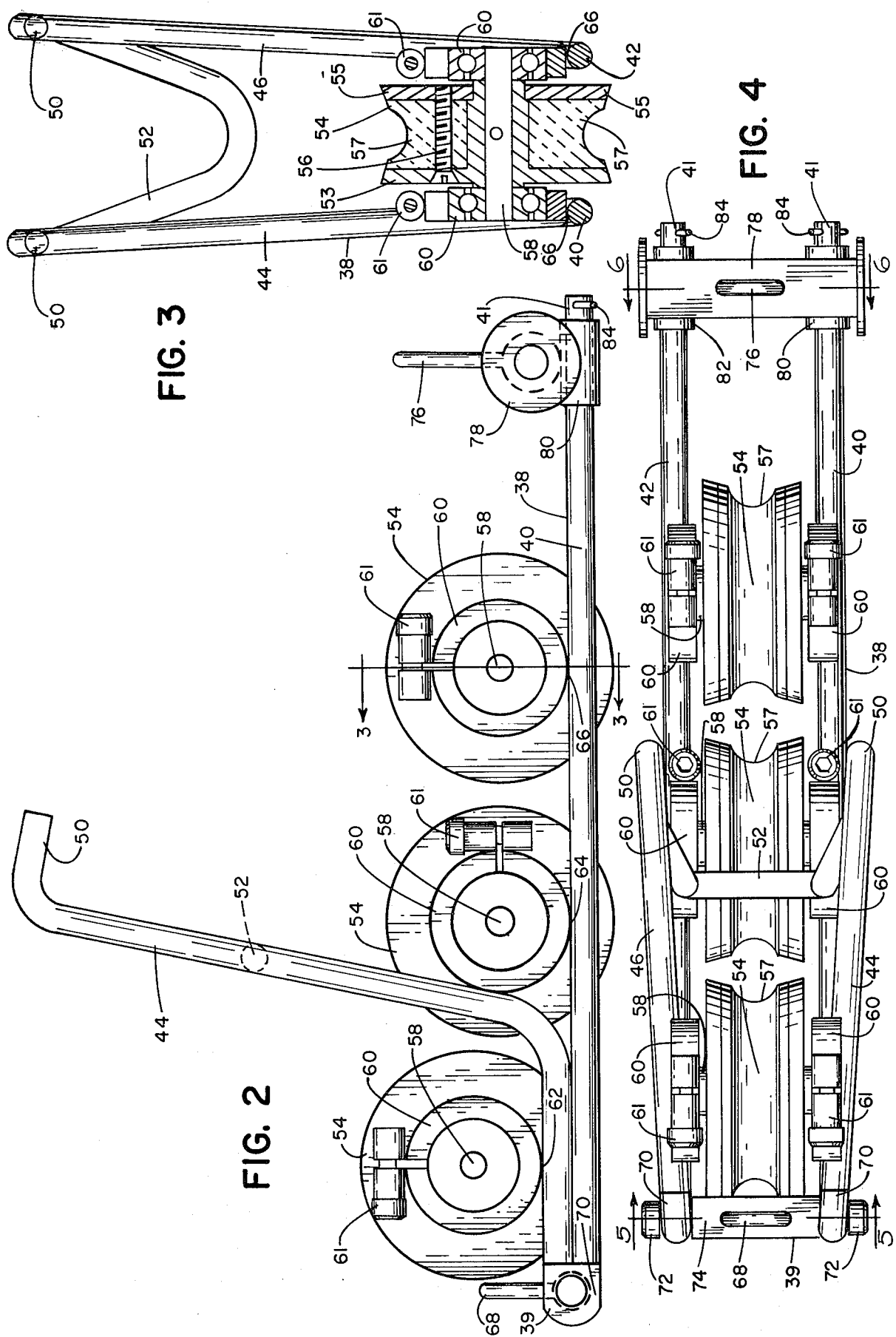

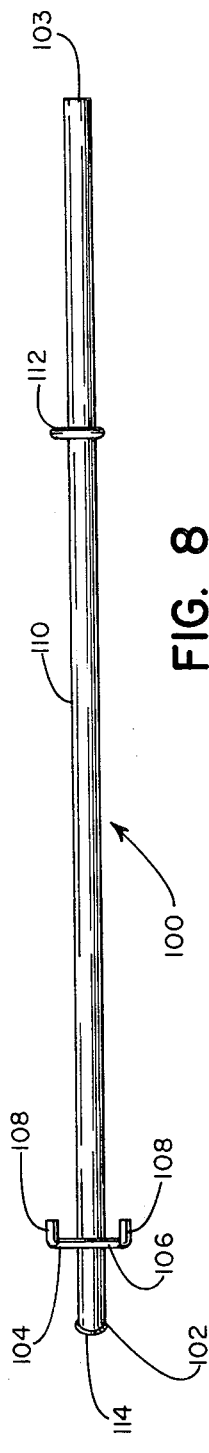
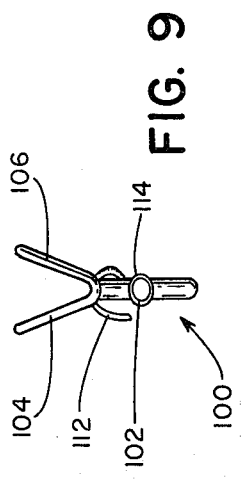
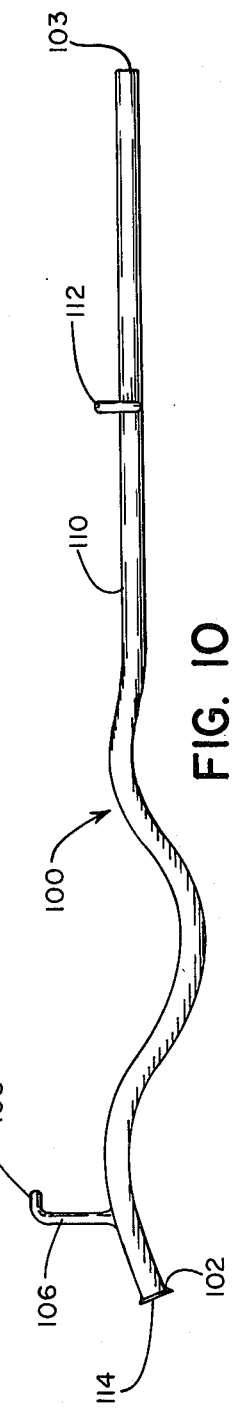
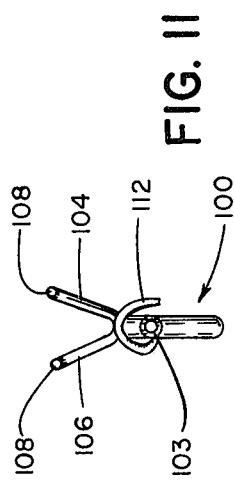
FIG. 8
FIG. 9
FIG. 10
FIG. 11

4,424,954

FIBER OPTIC CABLE TENSION LOADER

BACKGROUND OF THE INVENTION

1. Field of the Invention

The present invention relates to cable lashing machines, and specifically to a device to lash a fiber optic cable to a supporting strand.

2. Description of the Prior Art

Devices for lashing communications cable to a messenger or supporting strand are well known in the prior art. U.S. Pat. No. 3,057,600 shows a cable lashing machine for helically spinning a lashing wire about an aerial cable and a supporting strand to bind the cable to the strand. A variation of the machine taught in this patent is the "Model 'S' Pull Type Spinner" of Cable Spinning Equipment Company of Topeka, Kans. The prior art cable lashing machines are designed to lash cables composed of insulating material surrounding a conducting wire or wires. In general, the cable being lashed to the supporting strand is greater in diameter than the strand and, therefore, does not twist on the strand once secured to it.

The development of fiber optic cables for transmitting electrical impulses has necessitated improvement in the prior art cable lashing machines. Fiber optic cables are much more efficient than the previous wire conductor cables, and thus a fiber optic cable much smaller in diameter than a wire conductor cable can carry the same number of electrical impulses. In addition, fiber optic cable is much lighter than wire conductor cable.

The relative lightness and small diameter of fiber optic cable present substantial difficulties in using prior art cable lashing machines to secure the cable to a supporting strand which were designed for much heavier and larger wire conductor cable. Because of its relative smallness and lightness, the fiber optic cable tends to twist around the supporting strand when helically lashed by a prior art cable lashing machine. The twisting of fiber optic cable on the supporting strand damages the insulation on the fiber optic cable and thus reduces the cable's efficiency and impulse transmitting ability.

The present invention eliminates the problems associated with the twisting of a fiber optic cable on a supporting strand by eliminating the twisting itself. The damaging twisting of fiber optic cable caused by the prior art cable lashing machines is eliminated by the present invention which tensions the fiber optic cable as it passes through the cable lashing machine and is lashed to the supporting strand. The present invention provides a sufficient amount of tension to maintain the fiber optic cable coextensive relative to the supporting strand without twisting around on the strand.

SUMMARY OF THE INVENTION

The present invention is an improved cable lashing machine for securing fiber optic cable to a supporting strand. The cable lashing machine, which is movable along the supporting strand, has an elongated housing with a central through bore extending longitudinally thereof for reception of the fiber optic cable and the supporting strand. Mounted on the elongated housing is a spinning head which carries a coil of lashing line on a rotatable spool. As the elongated housing is advanced along the supporting strand, the spinning head pays out the lashing line so that it wraps helically around the fiber optic cable and the supporting strand. As the fiber optic cable passes through the bore, a tension loading device places sufficient tension on the fiber optic cable to maintain the fiber optic cable coextensive relative to the supporting strand as it is lashed to the supporting strand.

In one embodiment, the tension loading device has a frame which is attached to the elongated housing. A plurality of tension rollers are mounted on the frame and extend transversely to the frame. These rollers are positioned on the frame in a spaced relationship and engage the fiber optic cable as it passes over and under them, thereby loading tension on the cable as it passes through the elongated housing and is lashed to the supporting strand. A first guide is mounted proximate the forward end of the frame for guiding the fiber optic cable into engagement with the tension rollers. A second guide is mounted proximate the rearward end of the frame for guiding the fiber optic cable out of engagement with the tension rollers and into alignment for lashing the cable to the supporting strand coextensive with the supporting strand.

In another embodiment, the tension loading device is an elongated tension tube. The tension tube, which is mounted on the elongated housing, is curved in a generally serpentine or undulating form proximate its inlet or first end. The remainder of the tension tube is generally straight. The tension tube has a mouth portion at its first end which is flared outwardly to align and guide the fiber optic cable into and through the tension tube. As it passes through the tension tube, the fiber optic cable engages and drags against the curves of the undulating portion of the tension tube; this tensions the fiber optic cable as it passes through the elongated housing and is lashed to the supporting strand. The generally straight portion of the tension tube guides the fiber optic cable into position for coextensive lashing to the support strand. A hanger is attached to the tension tube and slidably mounted on the supporting strand to support the tension tube spaced relative to the cable supporting strand.

BRIEF DESCRIPTION OF THE DRAWINGS

FIG. 1 is a longitudinal sectional view of a cable lashing machine constructed in accordance with the present invention mounted upon a supporting strand showing a fiber optic cable tension loading device of the tension roller assembly type;

FIG. 2 is a side elevational view of the tension loading roller assembly of FIG. 1;

FIG. 3 is a transverse sectional view taken along line 3—3 in FIG. 2;

FIG. 4 is a top view of the tension roller assembly of FIG. 2;

FIG. 8 is a top view of the tension tube assembly of FIG. 7;

FIG. 9 is a front or inlet end view of the tension tube assembly of FIG. 8.

FIG. 10 is a side view of the tension tube assembly of FIG. 8;

FIG. 11 is a rear or exit end view of the tension tube assembly of FIG. 8;

DETAILED DESCRIPTION OF THE PREFERRED EMBODIMENTS

Figure 5:
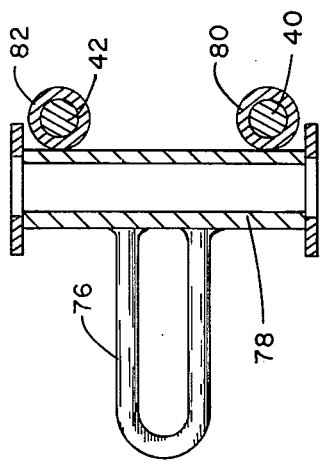
FIG. 5 is a transverse sectional view taken along line 5—5 in FIG. 4.
Figure 6:
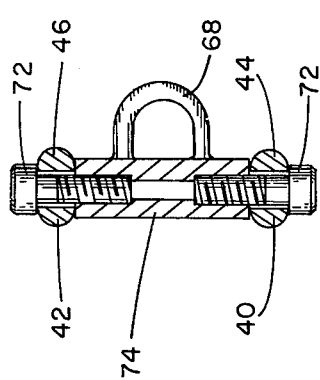
FIG. 6 is a transverse sectional view taken along line 6—6 in FIG. 4.

FIG. 1 shows a cable lashing machine 10 positioned on a supporting strand 12. The cable lashing machine 10 has an elongated housing 14 open at its forward end 16 and rearward end 18 to form a central through bore for reception of the supporting strand 12 and a communications cable, such as a fiber optic cable 34. The housing 14 is supported on and movable along the supporting strand 12 by means of rotatable grooved wheels 20 and 22. The grooves of wheels 20 and 22 conform substantially to the contour of the supporting strand 12 so that the wheels roll on the supporting strand and support the cable lashing machine 10 as it is advanced along the supporting strand 12.

Mounted adjacent the rearward end 18 of the housing 14 is a spinning head 24. The spinning head 24 is rotated about the longitudinal axis of the housing 14 of the cable lashing machine 10 by a drive means (not shown) which is effective when the cable lashing machine 10 is in use. Rotatably mounted upon the spinning head 24 is a spool 26 adapted to receive a coil of lashing line 28. The lashing line 28 paid out from the spool 26 extends through guide members (not shown) which position the line to be lashed and cause it to be helically wrapped around the supporting strand 12 and the fiber optic cable 34 by the cable lashing machine 10. The wrapping action is shown in U.S. Pat. No. 3,057,600. Preferably, the cable lashing machine 10 is advanced along the supporting strand 12 by pulling on tow line 30 secured to the housing 14 through link 32 and suitable connection means (not shown).

As shown in FIG. 1, the fiber optic cable 34 passes through the central bore of the housing 14 and is positioned by the cable lashing machine 10 to be secured to the supporting strand 12. To prevent damage to the fiber optic cable 34, the cable 34 is placed in tension by a tension loading device 36 mounted on the cable lashing machine 10. The tension applied to the cable 34 by the tension loading device 36 maintains the cable 34 coextensive relative to the supporting strand 12 as the lashing line 28 is helically wrapped around the supporting strand 12 and the cable 34.

One embodiment of the tension loading device 36 shown in FIGS. 1-6. In this embodiment, the tension loading device 36 has a frame 38 having a first end 39 and second end 41. The major components of the frame 38 are two straight members 40 and 42 and two upright members 44 and 46. The upright members 44 and 46 are secured to the straight members 40 and 42 proximate the first end 39 of the frame 38 and extend upwardly from the straight members 40 and 42 for mounting the frame 38 to the forward end 16 of the housing 14. A brace 52 spans the upper ends of upright members 44 and 46 to add stability to the frame 38.

For mounting purposes, the upright members 44 and 46 have rearwardly extending fingers 50. The frame 38 is mounted on the housing 14 by inserting the fingers 50 into a pair of spaced sockets 48 in the forward end 16 of the housing 14. The frame 38 is additionally supported proximate its second end 41 adjacent roller 51 of the housing 14.

Mounted transversely upon the frame 38 are a plurality of tension rollers 54. Preferably, each tension roller 54 has outer rims 53 and 55 selectively secured together by a screw 56, which also secures a center portion 57 having a grooved periphery between the rims 53 and 55 as shown in FIG. 3. In this way, the center portion 57 (the grooved periphery of which substantially conforms to the contour of the fiber optic cable 34) may be replaced if it becomes worn with usage. Each tension roller 54 is rotatably mounted on the frame 38 so that the roller 54 will rotate freely as the fiber optic cable 34 passes across it. Each roller is mounted on a shaft assembly 58 which, in turn, is rotatably mounted in a bearing held in a bearing clamp 60. Each bearing clamp 60 has fastener means 61 for securing the bearing clamp 60 over the bearings for shaft assembly 58. Loosening the fastener means 61 loosens the bearing clamp 60 for removal of the tension roller 54 and replacement of the center portion 57.

The bearing clamps 60 are welded to the frame 38 at points 62, 64 and 66 as shown in FIGS. 2 and 3. The relative position of the tension rollers 54 on the frame 38 is important in that their relation determines the amount of tension that is loaded on the fiber optic cable 34 as it passes through the tension loading device 36. In FIG. 1, the path of cable 34 across the tension rollers 54 is shown in a tension loading device having three tension rollers. The cable 34 first engages the lower portion of the forwardmost roller and then is directed over the upper portion of the central roller and then the lower portion of the rearmost roller. As it passes over and through the rollers in this fashion, the cable 34 follows a serpentine or undulating path, and as it engages the grooved periphery of center portion 57 of each roller 54 the cable 34 drags across the roller 54 and is loaded in tension as it exits the tension loading device 36 and housing 14 for lashing to the supporting strand 12.

The cable 34 is guided into contact with the forwardmost roller by guide means, such as a first guide loop 68. Loop 68 is mounted proximate the first end 39 of the frame 38, where upper supports 44 and 46 and members 40 and 42 are joined. The ends of members 40 and 42 and supports 44 and 46 at the first end 39 of the frame 38 are covered by a pair of caps 70 as shown in FIGS. 2 and 4. Each cap 70 and the ends of the frame members 40, 42, 44 and 46 are formed to accept pins 72. Loop 68 is mounted on a tubular member 74 positioned between the two caps 70 and adapted at its ends to securely accept pin 72. Member 74 is an integral part of frame 38, holding together members 40 and 42 and supports 44 and 46 at the first end 39 of the frame 38. Member 74 is positioned such that loop 68 extends upwardly from the first end 39 of the frame 38 for guiding the cable 34 into engagement with the forwardmost tension roller.

Guide means, such as second guide loop 76, are also provided proximate the second end 41 of the frame 38. Loop 76 is mounted upon cross member 78 which is slidably mounted on frame members 40 and 42 by sleeves 80 and 82. Member 78 thus becomes a part of the frame 38 by providing a brace between members 40 and 42 proximate the second end 41 of the frame 38. Removable fasteners, such as cotter pins 84, are secured at the second end 41 of the frame 38 to prevent cross member 78 from sliding off of the frame 38. As the cable 34 exits the rearmost roller, guide loop 76 guides and aligns the cable 34 into position and engagement with the supporting strand 12 for lashing as shown in FIG. 1.

In operation, as the cable lashing machine 10 is advanced along the supporting strand 12, the fiber optic cable 34 passes through the first guide loop 68 into engagement with the lower portion of the forwardmost tension roller. The cable 34 is then drawn over the upper portion of the central tension roller and then into engagement with the lower portion of the rearmost tension roller. By passing through the tension rollers in this fashion (shown in FIG. 1), the cable 34 engages substantial portions of the grooved periphery of center portion 57 of each roller 54. Engagement with the rollers 54 in this manner loads tension on the cable 34 as it passes over and under the rollers 54 and thus, when the cable 34 exits the rearmost roller and passes through the second guide loop 76, it has been drawn taut and loaded with a significant amount of tension.

As it exits the tension loading device 36, the tensioned cable 34 is guided by loop 76 into alignment coextensive with supporting strand 12. As the cable 34 is aligned next to supporting strand 12, lashing line 28 is paid out from spool 26 and helically wrapped around the supporting strand 12 and the cable 34 to secure the cable 34 to the supporting strand 12. The tension applied to cable 34 as it passes through the housing of the cable lashing machine 10 is sufficient to prevent the cable 34 from twisting on the supporting strand 12 as it is wrapped and thus prevents damage to the transmitting ability of the fiber optic cable 34.

Figure 7:
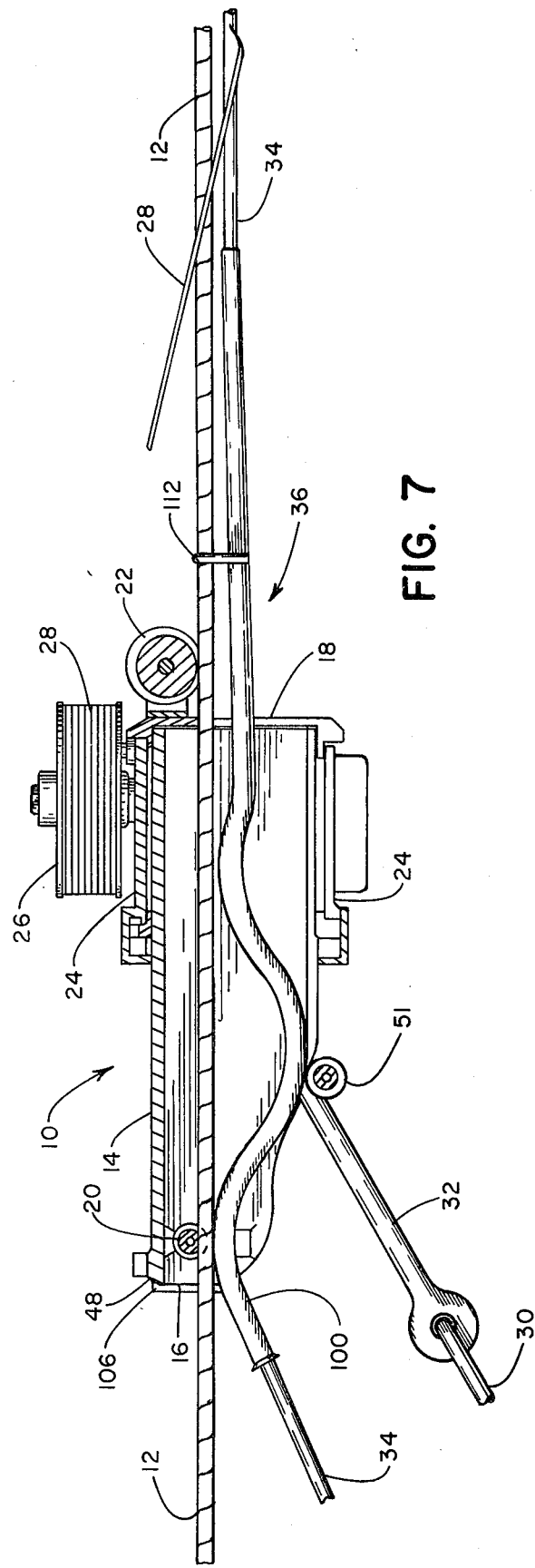
FIG. 7 is a longitudinal sectional view of another embodiment of a cable lashing machine constructed in accordance with the present invention showing a tube assembly for loading a fiber optic cable in tension.

Another embodiment of the tension loading device 36 is shown in FIGS. 7-11. In this embodiment, the tension loading device 36 is an elongated tension tube 100 through which the fiber optic cable 34 passes. In FIG. 7, the tension tube 100 is shown mounted on the cable lashing machine 10 partially within the housing 14. The tension tube has an inlet end 102 and an exit end 103.

Proximate the inlet end 102 of tension tube 100 are a pair of upright supports 104 and 106. For mounting purposes, upright supports 104 and 106 have rearwardly extending fingers 108. The tension tube 100 is mounted on the housing 14 by inserting the fingers 108 into the two spaced sockets 48 in the forward end 16 of the housing 14. The tension tube is additionally supported adjacent the roller 51 of the housing 14.

A portion of the tension tube 100 has a serpentine form having undulating curves, as shown generally in FIGS. 7 and 10. Preferably, the undulating curves are proximate the inlet end 102 of the tension tube 100, while the remainder of the tension tube 100, from point 110 to the exit end 103, is generally straight. The undulating or serpentine portion is formed by bending the tube in curved sections wherein the axis of the tube changes direction a plurality of times from a straight line. A hanger 112 is attached to the straight portion of tension tube 100 proximate the exit end 103. The hanger 112 is hooked over the supporting strand 12 to support the tension tube 100 and maintain the cable 34 coextensive with the supporting strand 12 for lashing as the cable 34 comes out of the exit end 103 of the tension tube 100. In addition, to align and guide the fiber optic cable 34 into the tension tube 100 the inlet end 102 has an outwardly flared mouth 114.

In operation, as the cable lashing machine 10 is advanced along the supporting strand 12, the fiber optic cable 34 enters the tension tube 100 at the mouth 114 of inlet end 102. The cable 34 then tracks the undulating curves of the serpentine portion of the tension tube 100 as it passes through the housing 14. In passing through the tension tube 100, the cable 34 is drawn over substantial portions of the tension tube curves. The cable 34 drags when engaged so that when the cable 34 exits the tension tube 100 at the exit end 103, it has been drawn taut and loaded with a significant amount of tension. As the tensioned cable 34 leaves the tension tube 100, the exit end 103 guides the cable 34 into alignment for lashing to the supporting strand 12, as shown in FIG. 7. The tension loaded to the cable 34 by the tension tube 100 is sufficient to maintain the cable 34 coextensive to the supporting strand 12 and thus prevents damage to the cable 34 as the lashing line 28 is helically wrapped around the fiber optic cable 34 and the supporting strand 12.

The lashing line 28 may be wire or cord, as desired. Also, the supporting strand 12 may be of any desired construction.

What is claimed is:

1. In a cable lashing machine which is movable along a supporting strand for securing a fiber optic cable to the supporting strand having:
    an elongated housing having forward and rearward ends and having a central through bore extending longitudinally thereof for reception of a fiber optic cable and the supporting strand; and
    a spinning head mounted on the elongated housing adjacent the rearward end of the elongated housing having means for tensionally paying out a lashing line so that the line wraps helically around the fiber optic cable and supporting strand as the elongated housing is advanced along the supporting strand;
    the improvement which comprises:
    means for loading the fiber optic cable in tension as it passes through the elongated housing central bore and is lashed to the supporting strand sufficiently to maintain the fiber optic cable coextensive relative to the supporting strand as the lashing line is wrapped around the cable and supporting strand.

2. The machine of claim 1 wherein the means for loading tension to the fiber optic cable comprises:
    a plurality of tension rollers and means to mount tension rollers on the elongated housing in a spaced relation and in position to engage the fiber optic cable and load tension thereto as the fiber optic cable passes through the elongated housing central bore and is lashed to the supporting strand.

3. The machine of claim 2 wherein there are three tension rollers comprising a center roller and two end rollers with the planes of the rollers being aligned along the path of travel of the cable and with the peripheries of the rollers adjacent the cable being wrapped around the center roller and guided by the end rollers.

4. The machine of claim 2 wherein the means for loading tension to the fiber optic cable further comprises means for guiding the fiber optic cable into engagement with the tension rollers.

5. The machine of claim 2 wherein the means for loading tension to the fiber optic cable further comprises means for guiding and aligning the fiber optic cable as it exists the tension rollers for positioning the cable to be lashed to the supporting strand.

6. The machine of claim 1 wherein the means for loading tension to the fiber optic cable comprises:
    an elongated tension tube and means to mount the tension tube on the elongated housing, a portion of the tension tube being curved in a generally serpentine form and the curves of the serpentine form portion of the tension tube being formed to engage the fiber optic cable and load tension thereto as the fiber optic cable passes through the tension tube and is lashed to the supporting strand.

7. The machine of claim 6 wherein the tension tube has a cable inlet end, a midportion and a cable outlet end, the serpentine form portion of the tension tube extending from the cable inlet end of the tension tube to its midportion, and the remainder of the tension tube from the midportion to the exit end being generally straight.

8. The machine of claim 7 wherein the tension tube is mounted in the elongated housing so that the serpentine form portion of the tension tube extends through the central bore of the housing forwardly from the rearward end of the housing, the cable inlet end of the tension tube extending forwardly of the forward end of the housing for reception of the fiber optic cable, and the generally straight portion of the tension tube extending rearwardly from the rearward end of the housing for positioning the cable to be lashed to the supporting strand as the cable exits the tension tube at the cable exit end of the tension tube.

9. The machine of claim 7 and a hanger slidable on the supporting strand mounted on the tension tube proximate its generally straight portion to maintain the cable exit end of the tension tube spaced relative to the supporting strand.

10. A method of securing a fiber optic cable to a supporting strand which comprises the steps of:
   loading tension to the fiber optic cable;
   aligning the fiber optic cable coextensive to the supporting strand; and
   wrapping a lashing line helically around the fiber optic cable and the supporting strand while the fiber optic cable remains under tension.

* * * * *